July 6, 1926.

R. E. TALLMAN

GLARESCREEN

Filed Oct. 9, 1925

1,591,345

Roy E. Tallman
Inventor

By C.A.Snow & Co.
Attorneys

Patented July 6, 1926.

1,591,345

UNITED STATES PATENT OFFICE.

ROY E. TALLMAN, OF FORT PLAIN, NEW YORK.

GLARESCREEN.

Application filed October 9, 1925. Serial No. 61,530.

This invention relates to a novel form of anti-glare device designed for positioning on the usual windshield to reflect the light rays of an approaching car, to the side of the road, to illuminate the side of the road and at the same time eliminates glaring.

An important object of the invention is to provide a device of this character adapted to be readily swung from its inactive position to its active position or vice versa.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing.

Figure 1:
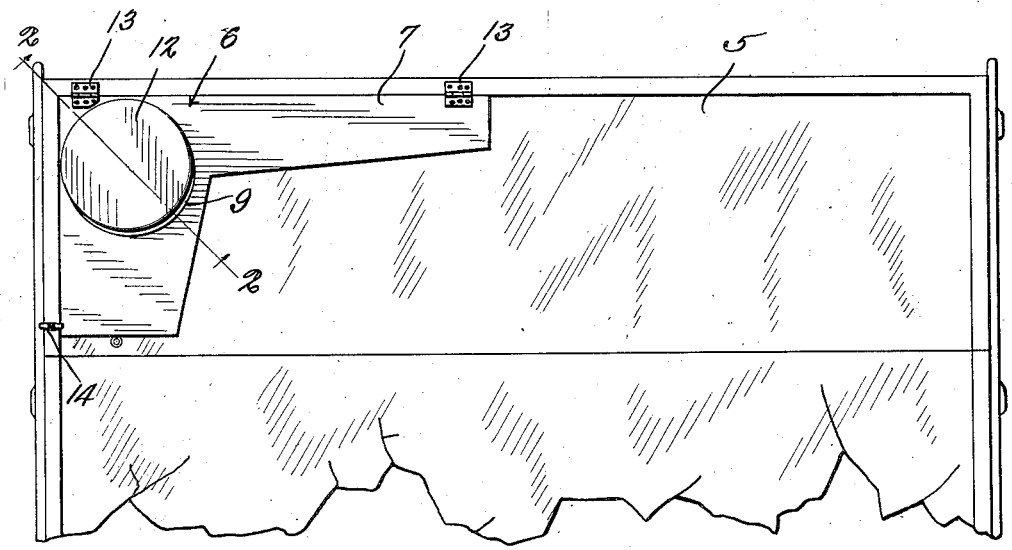
Figure 1 is an elevational view illustrating a device constructed in accordance with the invention as positioned on a windshield.

Referring to the drawing in detail, the reference character 5 indicates the windshield to which the device forming the essence of the invention is applied.

The device includes a body portion 6 that has an extension 7 adapted to shield the operator's eyes from the light rays of approaching vehicles, the extension being in a position to intersect, to a degree, the line of vision of the operator.

The body portion 6 is constructed preferably of sheet metal and is supplied with a cushioning member 8 disposed adjacent to the edge thereof and designed to engage the windshield associated with the device, to insure against the device rattling.

Figure 2:
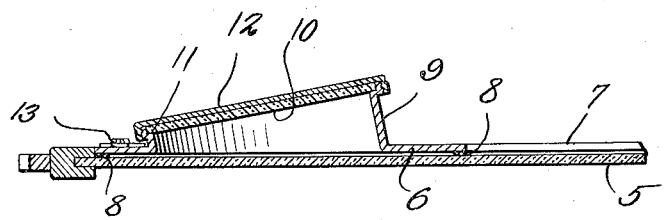
Figure 2 is a sectional view taken on line 2—2 of Figure 1.

As clearly illustrated by Figure 2 of the drawing, a portion of the body is extended outwardly as at 9 defining a circular flange, one portion of the flange being longer than the portion at the opposite side thereof to cause the mirror or reflecting element 10 supported thereby, to be held at an oblique angle with respect to the windshield to reflect light rays laterally and not directly in front of the car supplied with the device.

A shoulder indicated at 11 is formed on the flange and acts as a seat for the reflecting element 10, there being provided a securing ring 12 cooperating with the shoulder to secure the reflecting element in position.

From the foregoing it will be obvious that due to this construction, light rays will be directed to the reflecting element 10, which in turn will reflect the light rays laterally to illuminate the side of the road surface, and at the same time deflect the light rays from the eyes of the operator.

Hinges 13 secure the body portion 6 to the windshield and permit the body portion 6 to be moved from a position as shown by Figure 1 to a position under the usual top of the vehicle where it is out of the way while in its inactive position.

The reference character 14 indicates a button designed to engage the body portion and hold it in its active position.

I claim:

An anti-glare device for windshields including a body portion, said body portion having an opening formed therein, the wall of the opening extending outwardly providing a circular flange, said flange having a substantially wide portion and a narrow portion, a reflector secured to the flange, and said reflector adapted to reflect light rays laterally of the path of travel of a vehicle equipped with the device.

In testimony that I claim the foregoing as my own, I have hereto affixed my signature.

ROY E. TALLMAN.